US012301114B2

(12) United States Patent
Wu et al.

(10) Patent No.: US 12,301,114 B2
(45) Date of Patent: May 13, 2025

(54) SMART COMPENSATION FOR BUCK CONVERTERS IN DISCONTINUOUS CONDUCTION MODE

(71) Applicant: Dell Products L.P., Round Rock, TX (US)

(72) Inventors: Chia-Kun Wu, Taoyuan (SG); Shao-Suz Ho, New Taipei (SG); Wen-Yung Chang, Taoyuan (SG)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 17/972,811

(22) Filed: Oct. 25, 2022

(65) Prior Publication Data

US 2024/0136929 A1 Apr. 25, 2024
US 2024/0235396 A9 Jul. 11, 2024

(51) Int. Cl.
*H02M 1/08* (2006.01)
*H02M 3/158* (2006.01)

(52) U.S. Cl.
CPC ........... *H02M 3/1582* (2013.01); *H02M 1/08* (2013.01); *H02M 3/1588* (2013.01)

(58) Field of Classification Search
CPC ...................................................... H02M 1/08
See application file for complete search history.

(56) References Cited

U.S. PATENT DOCUMENTS

| | | | | |
|---|---|---|---|---|
| 10,658,930 | B2 | 5/2020 | Choi et al. | |
| 10,673,340 | B2 | 6/2020 | Bala | |
| 11,133,797 | B1 * | 9/2021 | Wu | H01L 29/7818 |
| 2005/0285661 | A1 * | 12/2005 | Wittenbreder | H03K 17/04206 327/434 |
| 2017/0250609 | A1 * | 8/2017 | Zhang | H02M 3/158 |

* cited by examiner

*Primary Examiner* — Harry R Behm
(74) *Attorney, Agent, or Firm* — Larson Newman, LLP

(57) ABSTRACT

A buck converter includes a high-side N-FET, a low-side N-FET, a P-FET, a between a gate terminal and a source terminal of the P-FET, aa capacitor, and a FET driver. The FET driver operates in a selectable one of a continuous current mode and a discontinuous current mode. In a first phase of the discontinuous current mode, a gate voltage on the gate terminal the N-FET equalizes to a source voltage on the source terminal of the N-FET to turn on the first N-FET. A high output voltage on a high-side output of the FET driver is high enough to overcome a threshold voltage of a body diode of the first P-FET to provide the high output voltage minus a threshold voltage to the gate terminal of the high-side P-FET to turn on the high-side P-FET.

20 Claims, 11 Drawing Sheets

112 VDD 302 Q1 R2 308 Q2 304 114 Cin Vin 102 104 310 PWM Controller MOSFET Driver HB HI HO HS LI LO CB 306 Q3 106 R3 QH 110 Q4 R1 118 116 L 202 108 QL Load Co 206 HI-R Q5 Inverter 204 300

Phase 2

SMART COMPENSATION FOR BUCK CONVERTERS IN DISCONTINUOUS CONDUCTION MODE

FIELD OF THE DISCLOSURE

This disclosure generally relates to information handling systems, and more particularly relates to providing smart compensation for buck converters in discontinuous conduction mode (DCM) in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A buck converter may include a high-side N-FET, a low-side N-FET, a P-FET, a between a gate terminal and a source terminal of the P-FET, aa capacitor, and a FET driver. The FET driver may operate in a selectable one of a continuous current mode and a discontinuous current mode. In a first phase of the discontinuous current mode, a gate voltage on the gate terminal the N-FET may equalize to a source voltage on the source terminal of the N-FET to turn on the first N-FET. A high output voltage on a high-side output of the FET driver may be high enough to overcome a threshold voltage of a body diode of the first P-FET to provide the high output voltage minus a threshold voltage to the gate terminal of the high-side P-FET to turn on the high-side P-FET

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1A:
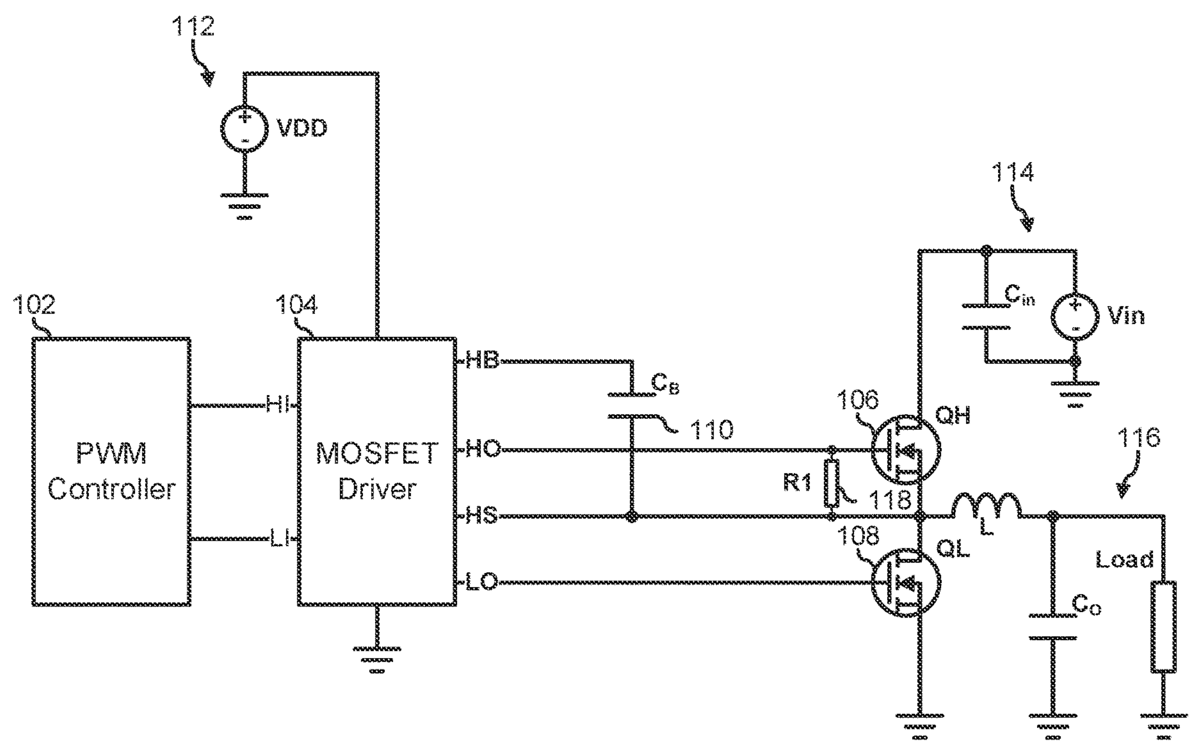
FIG. 1A is a schematic diagram of a buck converter for an information handling system as may be known in the art.

FIG. 1A illustrates a buck converter 100 as may be known in the art. Buck converter 100 includes a pulse-width modulation (PWM) controller 102, a MOSFET driver 104, a high-side MOSFET (QH) 106, a low-side MOSFET (QL) 108, a bootstrap capacitor ($C_B$) 110, a main power supply (VDD) 112, a secondary power supply 114 including an input power source (Vin) and an input capacitor ($C_{in}$), an output stage 116 including an inductor (L), an output capacitor ($C_O$), and a load, and a resistor (R1) 118. MOSFET driver 104 includes a positive supply terminal (VDD), a negative supply terminal (VSS), a high-side input (HI), a low-side input (LI), a high-side bootstrap supply output (HB), a high-side output (HO), a high-side source output (HS), and a low-side output (LO). A first output of PWM controller 102 is connected to the high-side input (HI) and a second output of the PWM is connected to the low-side input (LI). Main power supply (VDD) 112 is connected to the positive supply terminal (VDD) of MOSFET driver 104, and the negative supply terminal (VSS) is connected to a system ground plane.

High-side MOSFET (QH) 106 is connected by a drain terminal to secondary power supply 114, by a gate terminal to the high-side output (HO), and by a source terminal to the high-side source output (HS). Low-side MOSFET (QL) 108 is connected by a drain terminal to the high-side source output (HS) and to the source terminal of high-side MOSFET (QH) 106, by a gate terminal to the low-side output (LO), and by a source terminal to the system ground plane. The node including the high-side source output (HS), the source terminal of high-side MOSFET (QH) 106, and the drain terminal of low-side MOSFET (QL) 108 provides the power output to output stage 116. Bootstrap capacitor ($C_B$) 110 is connected by a first terminal to the high-side bootstrap supply output (HB), and by a second terminal to the high-side source output (HS). Resistor (R1) 118 is connected by a first terminal to the gate terminal of high-side MOSFET (QH) 106, and by a second terminal to the source terminal of the high-side MOSFET (QH). Resistor (R1) 118 is provided such that the gate terminal of high-side MOSFET (QH) is not permitted to float in any operating condition. The operation of buck converters in general, and in particular the operation of a buck converter similar to buck converter 100, are known in the art and will not be further described herein, except as may be needed to illustrate the current embodiments.

Buck converter 100 represents a common DC-DC PWM power converter topology that is widely used because of its simple design, and provides a stable poser supply to devices such as to information handling systems like information handling system 700 as described below. Buck converter 100 is typically operated in one of two operating modes: continuous conduction mode (CCM), and discontinuous conduction mode (DCM). In CCM, the duty cycles of both the high-side MOSFET (QH) 106 and the low-side MOSFET (QL) 108 are such that current is continuously flowing into output state 116, and more particularly that current is always flowing in the inductor (L). In DCM, the duty cycles of both the high-side MOSFET (QH) 106 and the low-side MOSFET (QL) 108 are such that current is not continuously flowing into output state 116, and more particularly that there are times in the duty cycle when no current is flowing in the inductor (L).

Buck converter 100 is typically designed to be operated in CCM when high output voltages or high output currents are demanded by output stage 116, or when the main power supply (VDD) 112 provides a low voltage level. Conversely, buck converter 100 is typically designed to be operated in DCM when low output voltages or low output currents are demanded by output stage 116, or when the main power supply (VDD) 112 provides a high voltage level. The power and efficiency demands on information handling systems are constantly increasing. For example, when a mobile device is powered by a battery, or when an computer system is operated in a stand-by state, the output power demand and the output current level may typically be very low. Thus, the demand for buck converters that operate will in the DCM is increasing.

However, operating buck converter 100 in DCM presents several problems. In particular, in DCM, both high-side MOSFET 106 and low-side MOSFET 108 are typically off during a portion of the duty cycle. In this case, when both high-side MOSFET 106 and low-side MOSFET 108 are off, bootstrap capacitor 110 is not provided with a circuit path to the ground plane, and thus the bootstrap capacitor can not charge up to provide the turn-on voltage to the gate terminal of the high-side MOSFET on a next cycle where power from secondary power supply 114 is needed. This case is particularly bad when the load demanded by output stage 116 is low. Further, when the current through inductor (L) of output stage 116 drops to zero (0) A, a resonance can be set up on the output of buck converter 100 with the inductor (L) and the parasitic capacitance of high-side MOSFET 106, causing ripple in the power rail to the load.

Figure 1B:
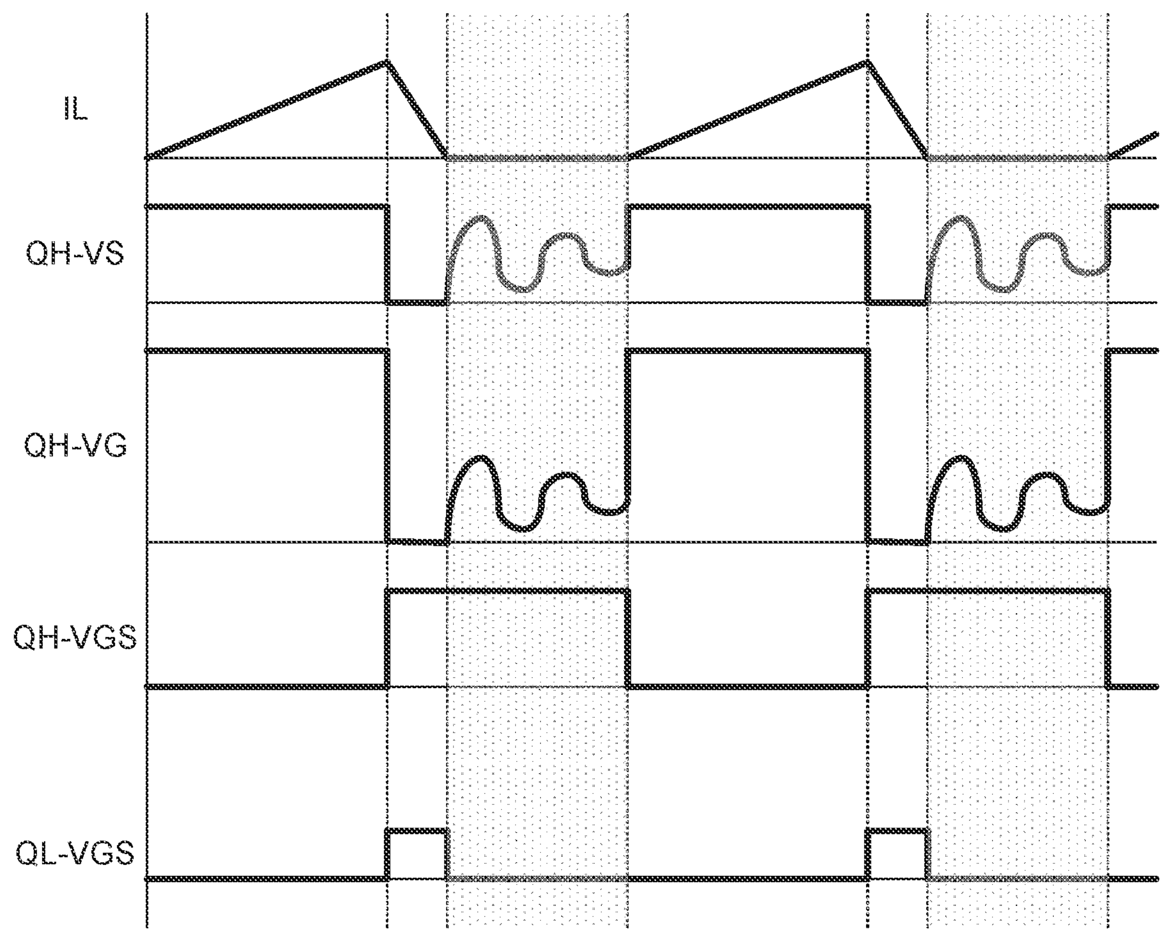
FIG. 1B illustrates the operation of the buck converter of FIG. 1A.

FIG. 1B illustrates the resonance effect on the source terminal and the gate terminal of high-side MOSFET 106 through two (2) operational cycles. Efforts to overcome these issues may include increasing the inductance of inductor (L) or increasing the PWM switching frequency of PWM controller 102. However, increasing the inductance of inductor (L) increases the cost and the layout space of buck converter 100, and increasing the PWM switching frequency of PWM controller 102 results in thermal issues in the PWM controller. Thus the topology of buck converter 100 may not be suitable for DCM operation.

Figure 2A:
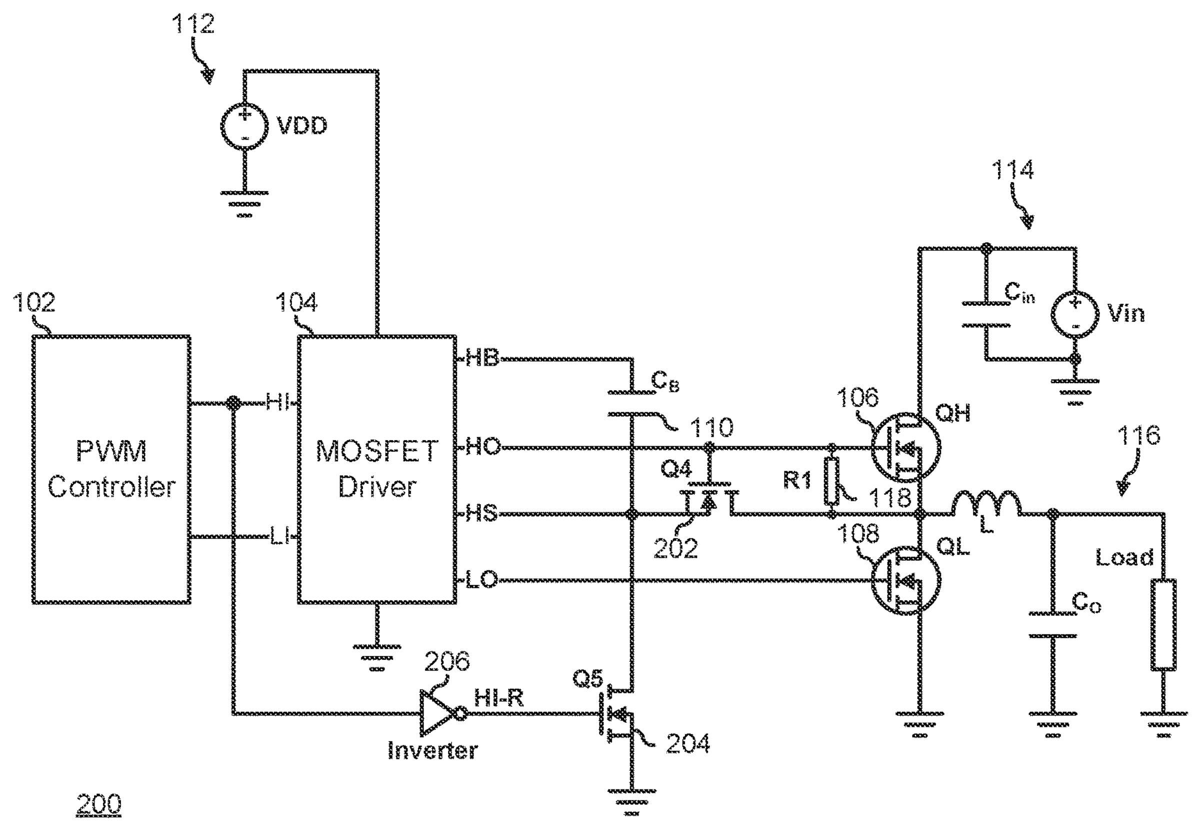
FIG. 2A is a schematic diagram of another buck converter for an information handling system as may be known in the art.

FIG. 2A illustrates a buck converter 200 as may be known in the art. Buck converter 200 is based upon the topology of buck converter 100, including PWM controller 102, MOSFET driver 104, high-side MOSFET (QH) 106, low-side MOSFET (QL) 108, bootstrap capacitor ($C_B$) 110, main power supply (VDD) 112, secondary power supply 114, and output stage 116. Thus, as regards PWM controller 102, MOSFET driver 104, high-side MOSFET (QH) 106, low-side MOSFET (QL) 108, bootstrap capacitor ($C_B$) 110, main power supply (VDD) 112, secondary power supply 114, and output stage 116. As such, buck converter 200 is configured with the same topology as buck converter 100, except as modified below.

Buck converter 200 further includes a FET (Q4) 202, a FET (Q5) 204, and an inverter 206. Transistor (Q4) 202 is connected by a drain terminal to the output node comprising the source terminal of high-side MOSFET (QH) 106 and the drain terminal of low-side MOSFET (QL) 108, by a source terminal to the high-side source output (HS) of MOSFET driver 104 and to the second terminal of bootstrap capacitor (C B) 110, and by a gate terminal to the high-side output of the MOSFET driver. In this way, the high-side source output (HS) is switched to the output node through FET (Q4) 202 based upon the high-side output (HO). Transistor (Q5) 204 is connected by a drain terminal to the node including the high-side source output (HS), the source terminal of FET (Q4) 202, and the second terminal of bootstrap capacitor (CB) 110, by a source terminal to the system ground plane, and by a gate terminal to an output of inverter 206. An input of inverter 206 is connected to the high-side input (HI). The operation of buck converters similar to buck converter 200, are known in the art and will not be further described herein, except as may be needed to illustrate the current embodiments.

Buck converter 200 represents an improvement on buck converter 100. In particular, buck converter 200 resolves the issue found in buck converter 100 in charging bootstrap capacitor 110 when operating in CCM. When PWM controller 102 places a high signal (i.e, a logic "1") on the high-side input (HI), MOSFET driver 104 likewise places a high signal on the high-side output (HO). The high signal on high-side output (HO) turns on FET (Q4) 202 which connects high-side source output (HS) to the output node, and permits bootstrap capacitor (C B) to contribute to the rapid turn on of high-side MOSFET 106. Further, when the high-side input (HI) is in the high signal state, inverter 206 inverts the high signal state to a low signal state, thereby turning off FET (Q5) 204, leaving bootstrap capacitor ($C_B$) 110 free to turn on high-side MOSFET (QH) 106. Then, when PWM controller 102 places a low signal (i.e, a logic "0") on the high-side input (HI), MOSFET driver 104 likewise places a low signal on the high-side output (HO). The low signal on high-side output (HO) turns off FET (Q4) 202 which disconnects high-side source output (HS) from the output node, thereby blocking bootstrap capacitor ($C_B$) from charging up. However, when the high-side input (HI) is in the low signal state, inverter 206 inverts the low signal state to a high signal state, thereby turning on FET (Q5) 204, and providing a ground circuit path for bootstrap capacitor ($C_B$) 110 to charge up. Thus buck converter 200 resolves the capacitor charging issue found in buck converter 100.

Figure 2B:
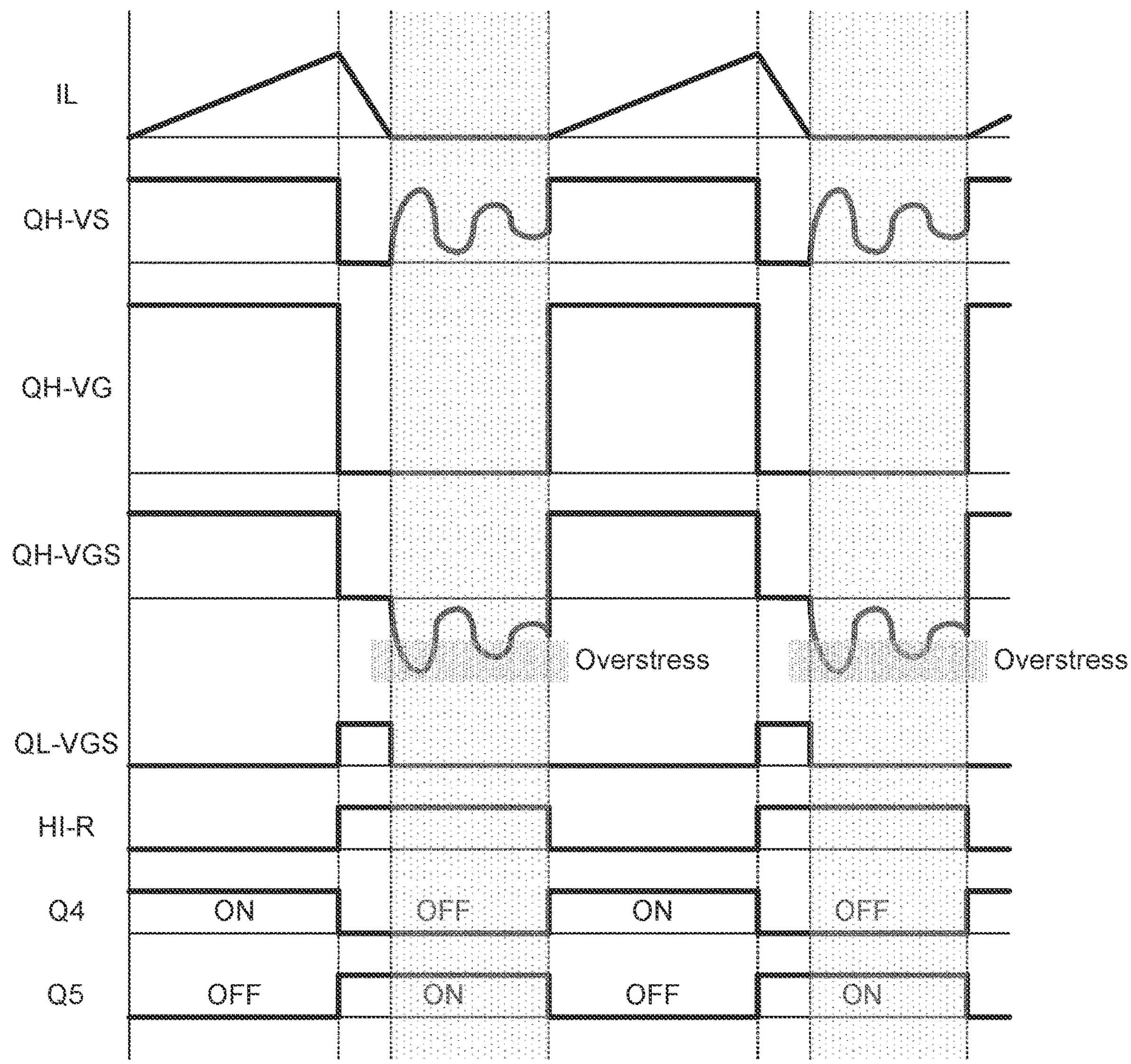
FIG. 2B illustrates the operation of the buck converter of FIG. 2A.

However, the topology of buck converter 200 does not resolve the oscillation problem with buck converter 100, but creates a new issue. Consider when the high-side output (HO) is in the low state and FET (Q4) 202 is turned off, disconnecting the high-side source output (HS) from the output node. This has the effect of changing the high-side output (HO) from a high-side source voltage (QH-VS) to a ground voltage, moving the resonant waveform from the high-side source voltage (QH-VS) to the high-side gate-to-source voltage (HS-VGS), thereby creating an overstress condition on high-side MOSFET 106, as can be seen in FIG. 2B. In particular cases, the overstress condition can be mitigated by the addition of a diode circuit (not illustrated) between the gate terminal of high-side MOSFET (QH) 106 and the output node, by adding a resistor/capacitor (RC) snubber circuit (not illustrated) between the output node and the system ground plane, or by adding both the diode circuit and the snubber circuit. However, such mitigation efforts add to the cost, complexity, and layout space for buck converter 200, and increase the heat generated and the power consumed by the buck converter. Further, such mitigation efforts only dampen the resonant effect, but do not eliminate the resonant effect on the buck converter.

Figure 3A:
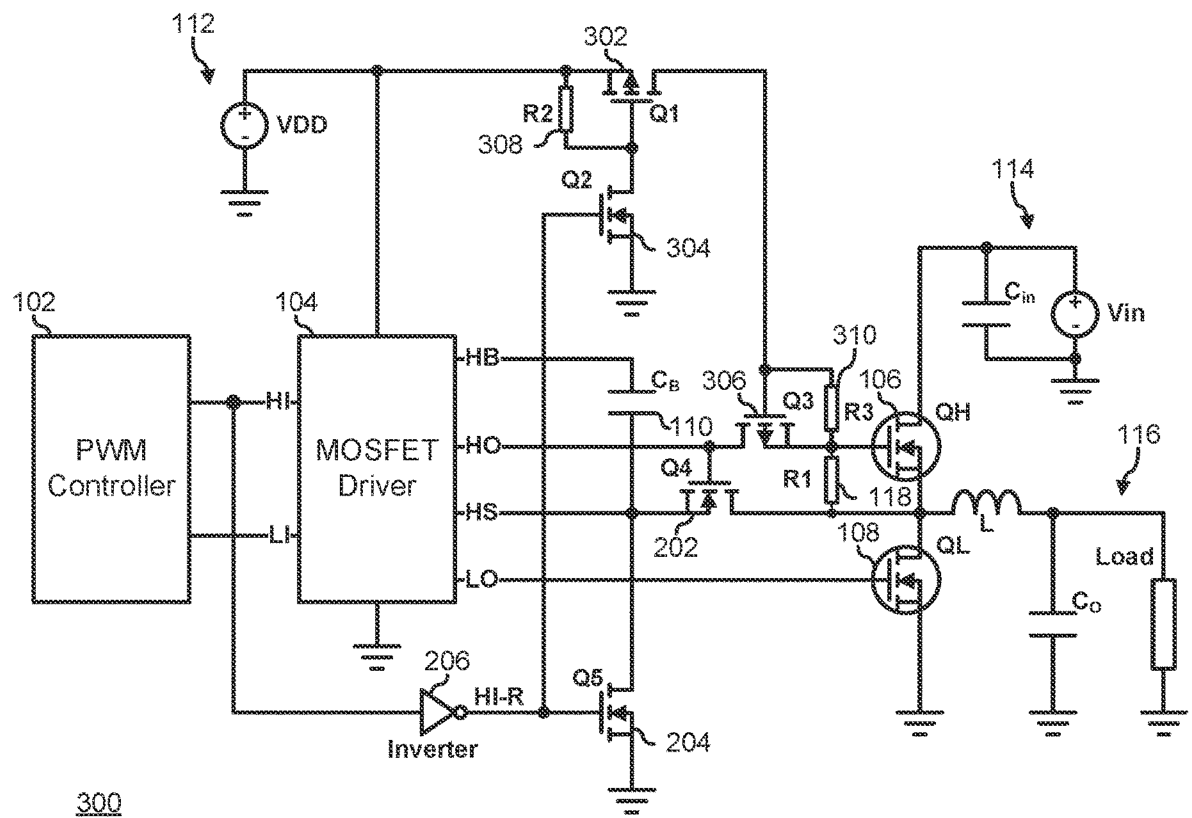
FIG. 3A is a schematic diagram of a buck converter for an information handling system according to an embodiment of the current disclosure.

FIG. 3A illustrates a buck converter 300 according to an embodiment of the current disclosure. Buck converter 300 is based upon the topology of buck converter 100 and buck converter 200, including PWM controller 102, MOSFET driver 104, high-side MOSFET (QH) 106, low-side MOSFET (QL) 108, bootstrap capacitor ($C_B$) 110, main power supply (VDD) 112, secondary power supply 114, and output stage 116. Thus, as regards PWM controller 102, MOSFET driver 104, high-side MOSFET (QH) 106, low-side MOSFET (QL) 108, bootstrap capacitor ($C_B$) 110, main power supply (VDD) 112, secondary power supply 114, output stage 116, FFET (Q4) 202, FET (Q5) 204, and inverter 206. As such, buck converter 300 is configured with the same topology as buck converter 200, except as modified below.

Buck converter 300 further includes a FET (Q1) 302, a FET (Q2) 304, a FET (Q3) 306, a resistor (R2) 308, and a resistor (R3) 310. Transistor (Q1) 302 is connected by a source terminal to primary power supply 112, by a drain terminal to a gate terminal of FET (Q3) 306, and by a gate terminal to a drain terminal of FET (Q2) 304. Transistor (Q1) 302 is illustrated as including a parasitic drain-to-gate resistance. Transistor (Q2) 204 is connected by a source terminal to the system ground plane, and by a gate terminal to the output of inverter 206 and the gate terminal of FET (Q5) 204. FET (Q3) 206 is connected by a source terminal to the high-side output (HO) and the gate terminal of FET (Q4) 202, and by a drain terminal to the gate terminal of high-side MOSFET (QH) 106. FET (Q3) 306 is illustrated as including a parasitic drain-to-gate resistance. In this way, the high-side output (HO) is switched to the gate terminal of high-side MOSFET (QH) 106 based upon the state of FET (Q1) 302. Resistor (R2) 308 is connected by a first terminal to the gate terminal of FET (Q1) 302, and by a second terminal to the source terminal of the FET (Q1). Resistor (R2) 308 is provided such that the gate terminal of FET (Q1) is not permitted to float in any operating condition. Resistor (R3) 310 is connected by a first terminal to the gate terminal of FET (Q3) 306, and by a second terminal to the source terminal of the FET (Q3). Resistor (R3) 310 is provided such that the gate terminal of FET (Q3) is not permitted to float in any operating condition.

Figure 3B:
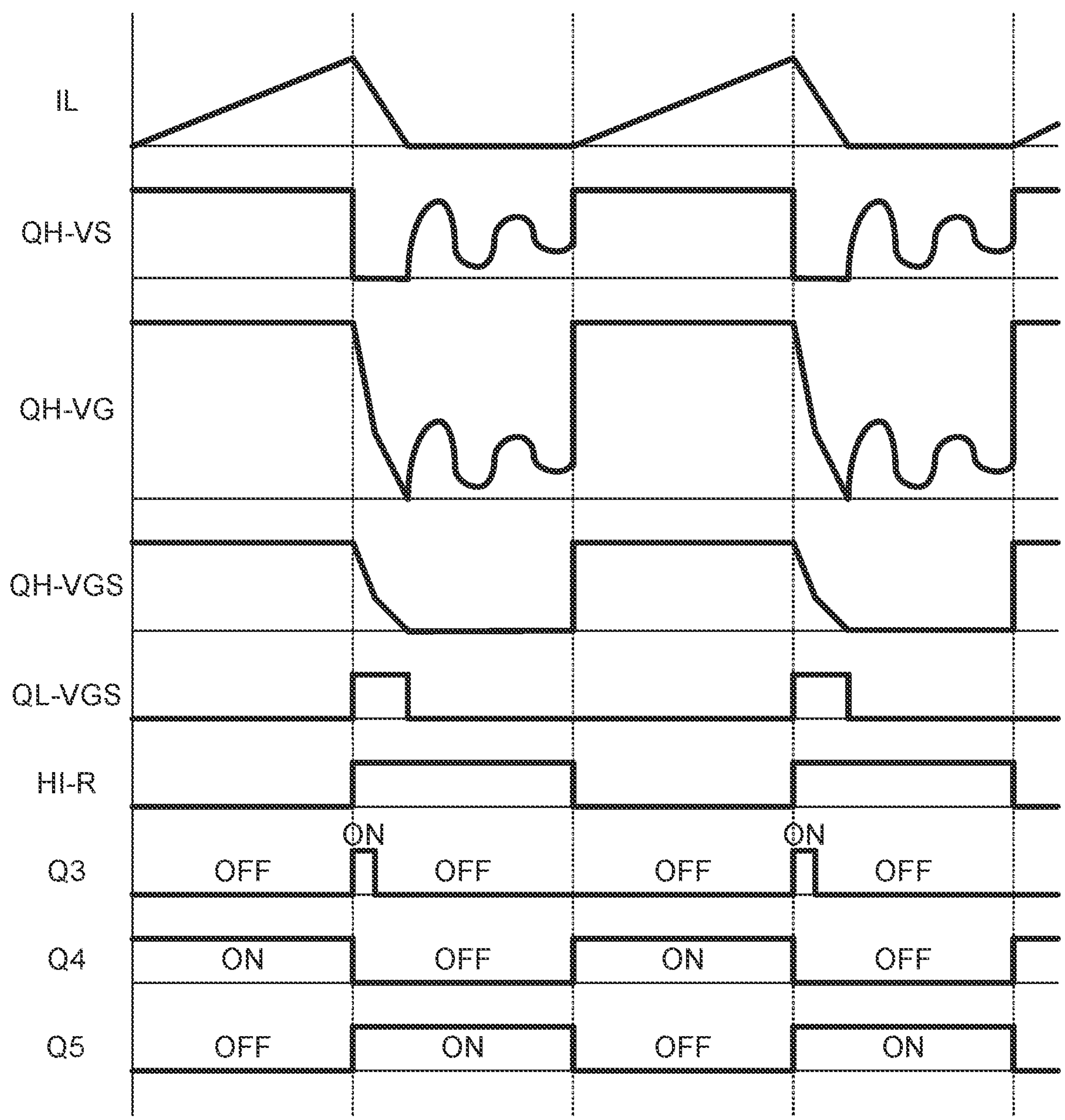
FIG. 3B illustrates the operation of the buck converter of FIG. 3A.

Buck converter 300 represents an improvement on buck converter 200. In particular, buck converter 300 resolves the issue found in buck converter 200 related to resonance created when the output current goes to zero (0) A. FIG. 3B illustrates the operation of buck converter 300 through two (2) operational cycles. The operation of buck converter 300 will be further described in two stages. The first stage will be illustrated in FIG. 4A and FIG. 4B, and the second stage will be illustrated in FIG. 5A and FIG. 5B.

Figure 4A:
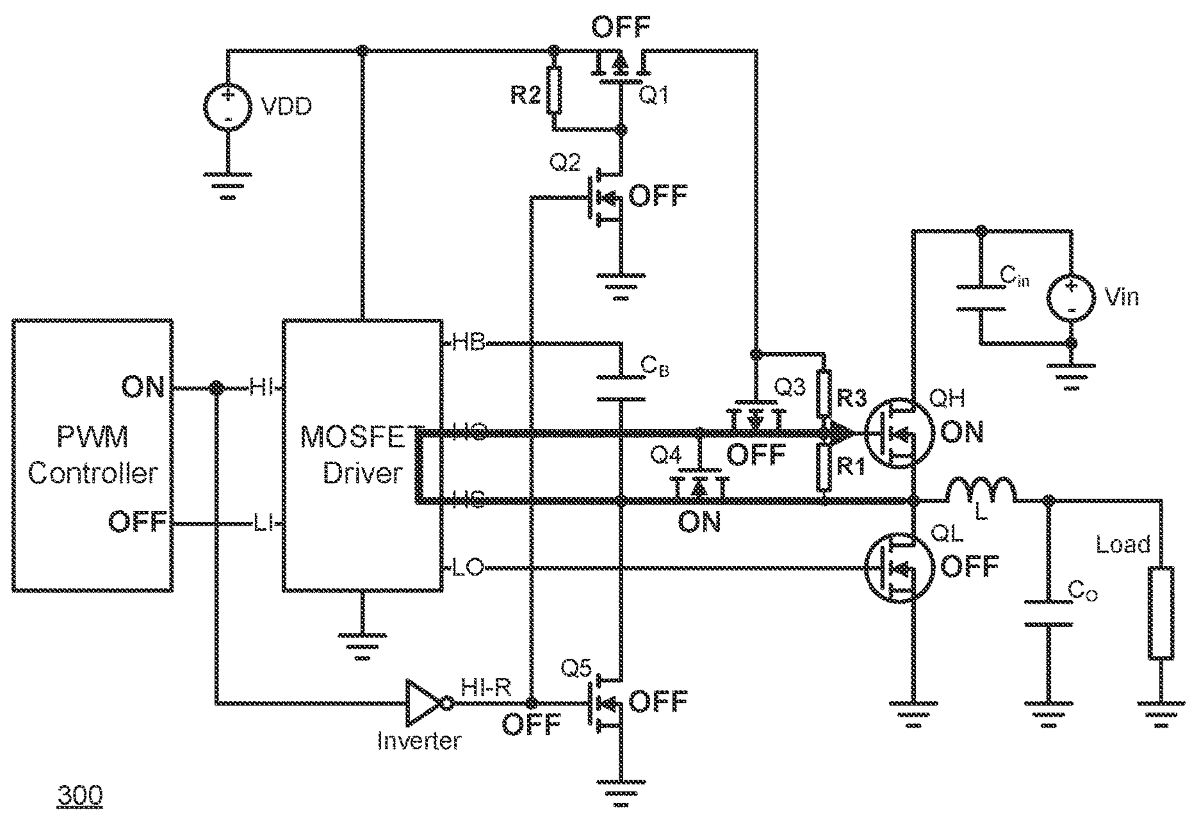
FIG. 4A illustrates the buck converter of FIG. 3A in a first phase of operation.
Figure 4B:
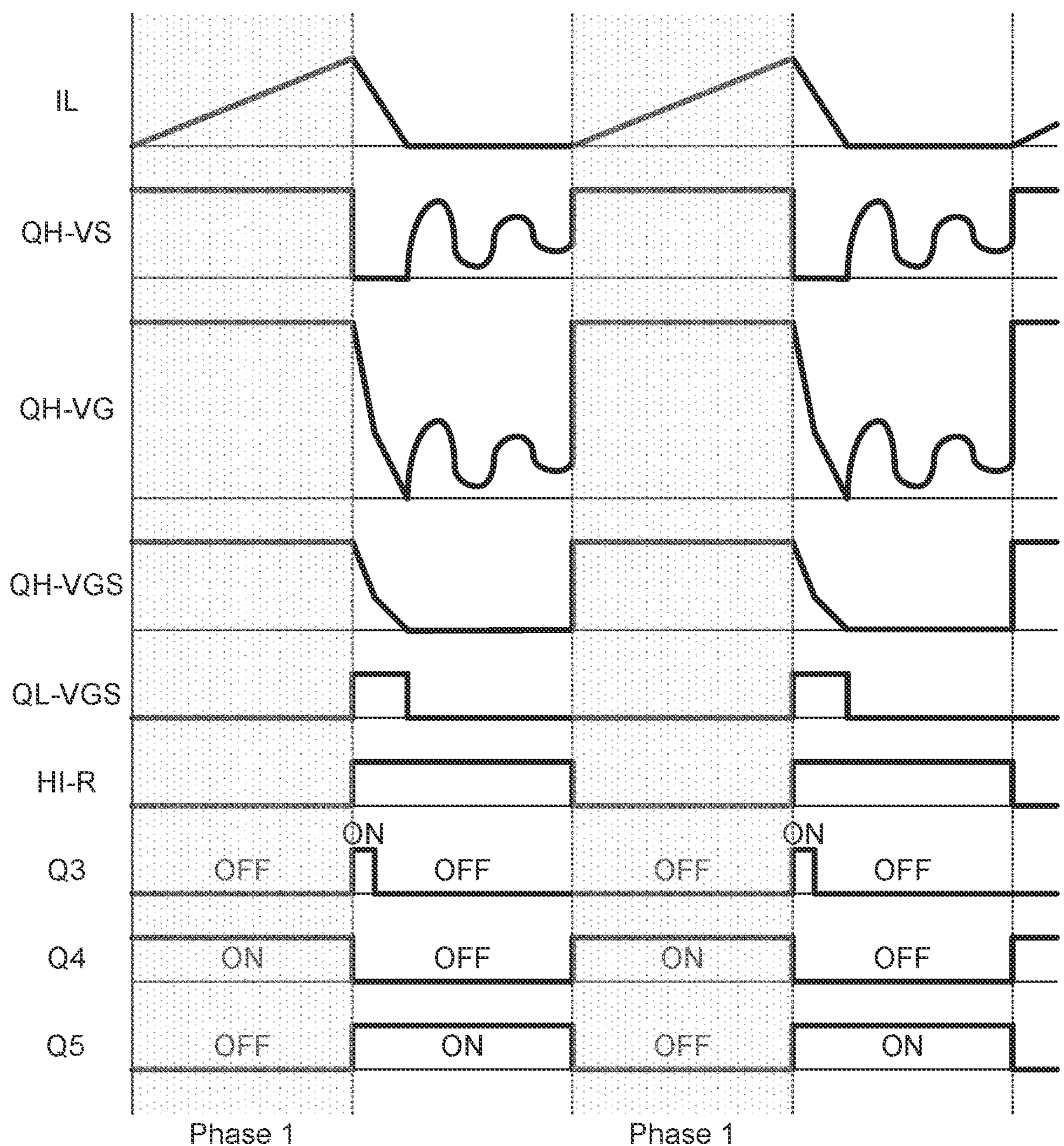
FIG. 4B illustrates the operation of the buck converter of FIG. 3A in the first phase of operation.

FIG. 4A and FIG. 4B illustrate the first phase when PWM controller 102 places a high signal on the high-side input (HI). Here, MOSFET driver 104 likewise places a high signal on the high-side output (HO), turning on FET (Q4) 202 which connects high-side source output (HS) to the output node, and permits bootstrap capacitor ($C_B$) to contribute to the rapid turn on of high-side MOSFET 106. Note that the high signal on high-side input (HI) is inverted to a low signal by inverter 206, turning off FET (Q5) 204, as described above, and also turning off FET (Q2) 304. As a result of turning off FET (Q2) 304, the gate terminal of FET (Q1) is pulled high through resistor (R2) 308, turning off FET (Q1) 302. With FET (Q1) 302 turned off, the gate terminal of FET (Q3) 306 is set to:

$$Q3-VG=Q3-VS \quad \text{Equation 1:}$$

through resistor (R3) 310, where Q3−VG is the gate voltage of the FET (Q3), and Q3−VS is the source voltage of the FET (Q3).

When the high-side input (HI) is high, the body diode of FET (Q3) 306 permits a voltage level at the gate terminal of high-side MOSFET (QH) 106 sufficient to turn on the high-side MOSFET (QH). In particular, $$QH-VGS=HO-HS=(VHS+VC_B)-VHS=VC_B \quad \text{Equation 2;}$$

and $$QH-VG=VDD+VCB-1\,V \quad \text{Equation 3.}$$

through the body diode of FET (Q3) 306. The gate terminal of high-side MOSFET (QH) 106 is connected to the source terminal of FET (Q3) 306). Thus, if:

$$Q3-VS>VDD+1\,V(Q1 \text{ body diode voltage}) \quad \text{Equation 4,}$$

then the gate voltage of the FET (Q3) (Q3−VG) goes to VDD. As such, the state of FET (Q3) 306 is dependent upon the source voltage of the FET (Q3) (Q3−VS). Thus, in the early portion of phase 1, Q3−VS rises gradually. If Q3−VS is not high enough, FET (Q3) 306 is off, and the Q3−VS is charged via body diode of the FET (Q3). Then, as Q3−VS rises, Q3−VGS drops and FET (Q3) 306 is turned on.

Figure 5A:
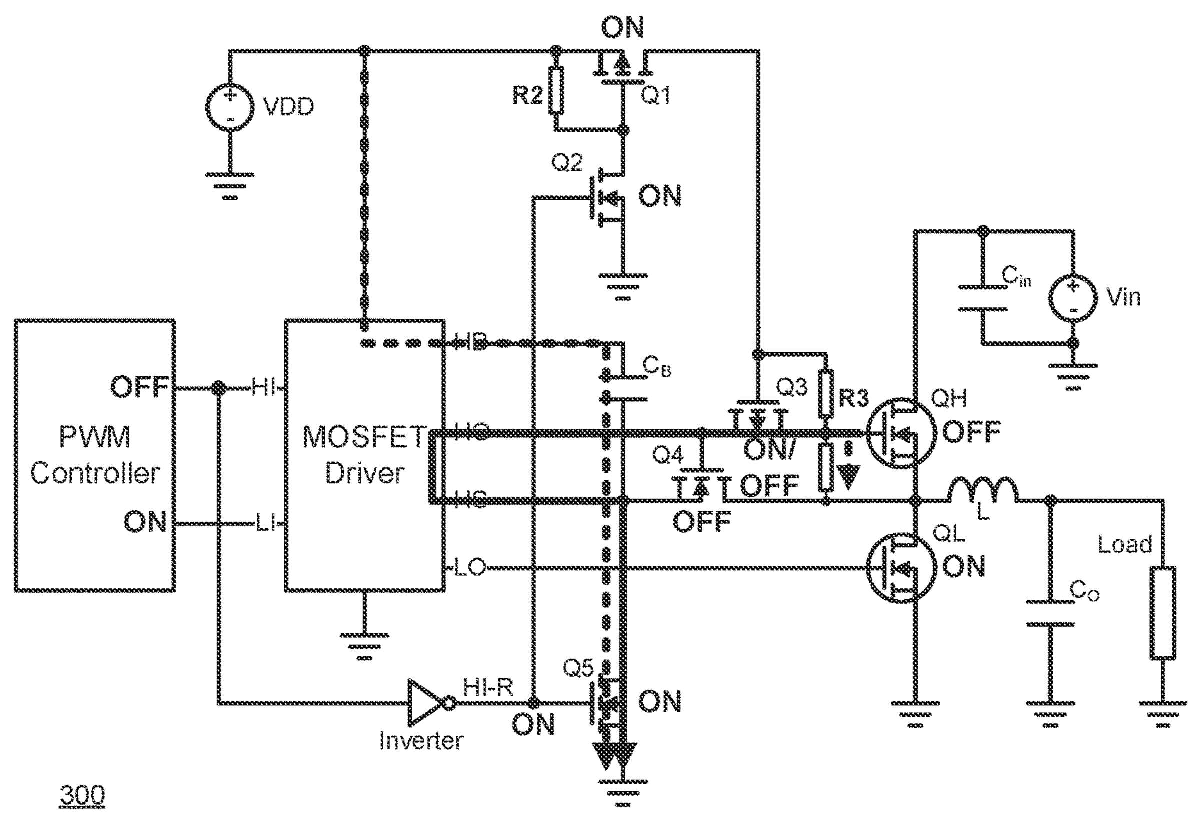
FIG. 5A illustrates the buck converter of FIG. 3A in a second phase of operation.
Figure 5B:
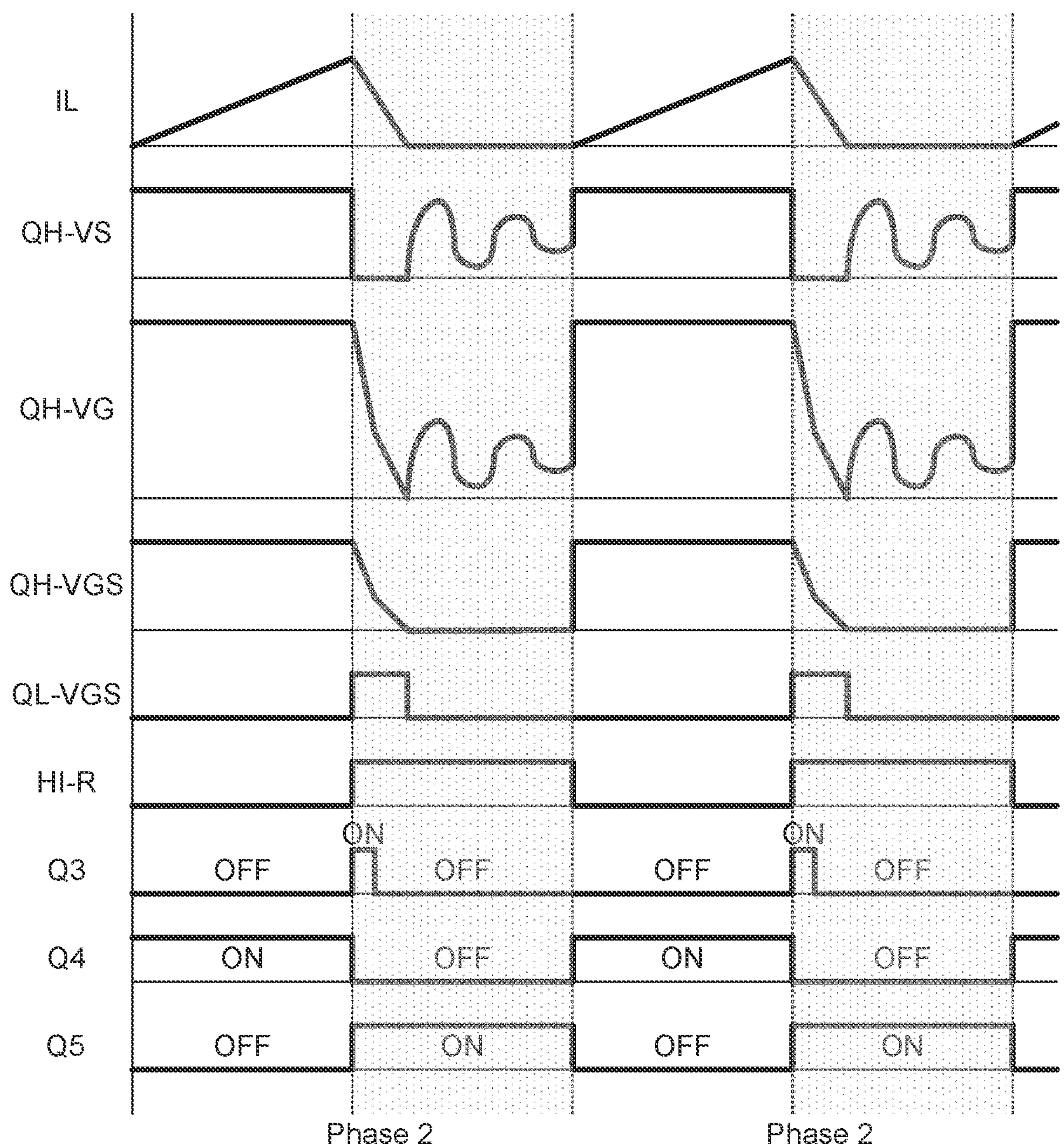
FIG. 5B illustrates the operation of the buck converter of FIG. 3A in the second phase of operation.

Then, in FIG. 5A and FIG. 5B, when PWM controller 102 places a low signal on the high-side input (HI), MOSFET driver 104 likewise places a low signal on the high-side output (HO), and inverter 206 places a high signal on the gate terminal of FET (Q5) 206, permitting a charge path for bootstrap capacitor (C P) 110, as described above. Inverter 206 also places a high signal on the gate terminal of FET (Q2) 304, which turns on FET (Q1) 302, which turns on FET (Q3) 306. With FET (Q3) 306 turned on, a path back through MOSFET driver 104 to high-side source output (HS) and to the system ground plane through FET (Q5) 204, as shown. This circuit path permits the gate voltage on the gate terminal of high-side MOSFET (QH) to dissipate, thereby rapidly turning off the high-side MOSFET (QH). This circuit path persists while the gate voltage on the gate terminal of high-side MOSFET (QH) 106 (QH-VG) is greater than the sum of VDD plus the gate-to-source threshold of FET (Q3) 306 (Q3 VGSth). In particular:

$$QH-VG>VDD+Q3\,VGSth \quad \text{Equation 5.}$$

Then, when the gate voltage on the gate terminal of high-side MOSFET (QH) 106 (QH−VG) is less than the sum of VDD plus the gate-to-source threshold of FET (Q3) 306 (Q3 VGSth) then the FET (Q3) is turned off In particular:

$$QH-VG<VDD+Q3VGSth \quad \text{Equation 6.}$$

At this time, the voltage on the gate terminal of high-side MOSFET (QH) 106 continues to drain through the gate-to-source resistance of the high-side MOSFET (QH) (QH−RGS), as shown by the dashed circuit path between the gate terminal and the source terminal.

The low signal on high-side output (HO) turns off FET (Q4) 202 which disconnects high-side source output (HS) from the output node, thereby blocking bootstrap capacitor ($C_B$) from charging up. However, when the high-side input (HI) is in the low signal state, inverter 206 inverts the low signal state to a high signal state, thereby turning on FET (Q5) 204, and providing a ground circuit path for bootstrap capacitor ($C_B$) 110 to charge up. Thus buck converter 300 resolves the capacitor charging issue found in buck converter 100. The resonance that occurs when the output current goes to zero (0) A is exhibited on the gate terminal of the high-side MOSFET (QH−VS), rather than on the gate-to-source voltage (QH−VGS). Thus buck converter 300 also resolves the overstress issue created in buck converter 200.

Figure 6:
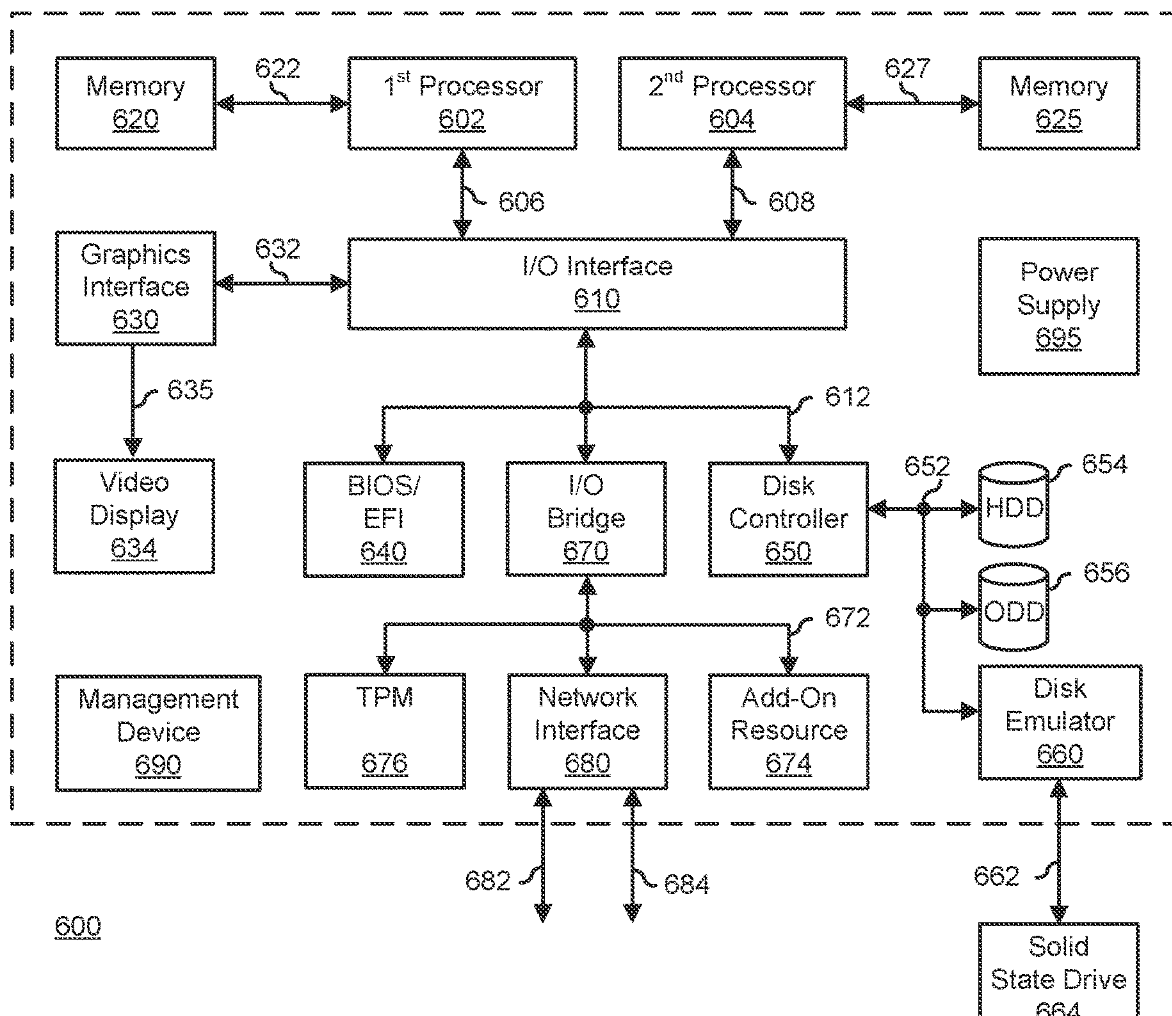
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620 and 625, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 635 to a video display 634. In a particular embodiment, information handling system 600 includes separate memories that are dedicated to each of processors 602 and 604 via separate memory interfaces. An example of memories 620 and 625 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on a separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A buck converter for an information handling system, the buck converter comprising:

a high-side N-FET having a drain terminal coupled to a first power supply, a gate terminal, and a source terminal;

a low-side N-FET having a drain terminal coupled to the source terminal of the high-side N-FET, a gate terminal, and a source terminal coupled to a ground plane;

a first P-FET having a drain terminal, a gate terminal, and a source terminal coupled to the gate terminal of the high-side N-FET;

a first resistor having a first terminal coupled to the gate terminal of the first P-FET and a second terminal coupled to the source terminal of the first P-FET and to the gate terminal of the high-side N-FET;

a capacitor having a first terminal coupled to the source terminal of the high-side N-FET and to the drain terminal of the low-side N-FET, and a second terminal; and a FET driver having a high-side output coupled to the drain terminal of the first P-FET, a high-side source output coupled to the source contact of the high-side N-FET and to the drain contact of the low-side N-FET, a low-side output coupled to the gate terminal of the low-side N-FET, and a capacitor output coupled to the second terminal of the capacitor, wherein the FET driver operates in a selectable one of a continuous current mode and a discontinuous current mode;

wherein in a first portion of a first phase of the discontinuous current mode, a high voltage level of the high-side output is high enough to overcome a threshold voltage of a body diode of the first P-FET to provide a voltage at the gate terminal of the high-side N-FET that is equal to the high voltage level of the high-side output minus the threshold voltage to turn on the high-side N-FET.

2. The buck converter of claim 1, wherein, in a second portion of the first phase of the discontinuous current mode, a gate voltage on the gate terminal of the high-side N-FET equalizes to a source voltage on the source terminal of the high-side N-FET.

3. The buck converter of claim 2, further comprising:

a second P-FET having a drain terminal coupled to the gate terminal of the first P-FET, a gate terminal, and a drain terminal coupled to a second power supply; and a second resistor having a first terminal coupled to the gate terminal of the second P-FET and a second terminal coupled to the source terminal of the second P-FET and to the second power supply.

4. The buck converter of claim 3, wherein, when the high-side output exhibits the high voltage level, a gate voltage on the gate terminal of the second P-FET equalizes to the voltage level of the second power supply to turn off the second P-FET.

5. The buck converter of claim 4, further comprising a first N-FET having a drain terminal coupled to the gate terminal of the second P-FET and to the first terminal of the second resistor, a gate terminal, and a source terminal coupled to the ground plane.

6. The buck converter of claim 5, wherein, when the high-side output exhibits the high voltage level, the gate terminal of the first N-FET receives a logic low voltage to turn off the first N-FET, permitting the gate terminal of the second P-FET rise to the voltage level of the second power supply through the second resistor.

7. The buck converter of claim 6, further comprising a second N-FET having a drain terminal coupled to the second terminal of the first resistor, the source terminal of the high-side N-FET, and to the drain terminal of the low-side N-FET, a gate terminal couple to the high-side output and to the drain terminal of the first P-FET, and a source terminal coupled to the high-side source output.

8. The buck converter of claim 7, wherein, in a second phase of the discontinuous current mode, the high-side output exhibits the logic low voltage to turn off the second N-FET.

9. The buck converter of claim 8, further comprising a third N-FET having a drain terminal coupled to the high-side source output, the first terminal of the capacitor, and the source terminal of the second N-FET, a source terminal coupled to the ground plane, and a gate terminal.

10. The buck converter of claim 9, wherein the FET driver further includes a high-side input from a controller, and wherein, in the first phase the high-side input receives a logic high voltage from the controller, and, in the second phase the high-side input receives the logic low voltage from the controller.

11. The buck converter of claim 10, further comprising an inverter having an input terminal coupled to the high-side input, and an output terminal coupled to the gate terminal of the first N-FET and to the gate terminal of the third N-FET.

12. A method for providing a buck converter for an information handling system, the method comprising:

coupling a drain terminal of a high-side N-FET to a first power supply;

coupling a drain terminal of a low-side N-FET to a source terminal of the high-side N-FET;

coupling a source terminal of the low-side N-FET to a ground plane;

coupling a source terminal of a first P-FET to a gate terminal of the high-side N-FET;

coupling a first terminal of a resistor to a gate terminal of the fist P-FET;

coupling a second terminal of the resistor to the source terminal of the first P-FET and to the gate terminal of the high-side N-FET;

coupling a first terminal of a capacitor having to a source terminal of the high-side N-FET and to the drain terminal of the low-side N-FET;

coupling a second terminal of the capacitor to a capacitor output of a FET driver;

coupling a high-side output of the FET driver to the drain terminal of the first P-FET;

coupling a high-side source output of the FET driver to the source contact of the high-side N-FET and to the drain contact of the low-side N-FET; and coupling a low-side output of the FET driver to a gate terminal of the low-side N-FET, wherein the FET driver operates in a selectable one of a continuous current mode and a discontinuous current mode;

wherein in a first portion of a first phase of the discontinuous current mode, a high voltage level of the high-side output is high enough to overcome a threshold voltage of a body diode of the first P-FET to provide a voltage at the gate terminal of the high-side N-FET that is equal to the high voltage level minus the threshold voltage to turn on the high-side N-FET.

13. The method of claim 12, wherein, in a second portion of the first phase of the discontinuous current mode, a gate voltage on the gate terminal of the high-side N-FET equalizes to a source voltage on the source terminal of the high-side N-FET to turn on the high-side N-FET.

14. The method of claim 13, further comprising:

coupling a drain terminal of a second P-FET to the gate terminal of the first P-FET;

coupling a source terminal of the second P-FET to a second power supply;

coupling a first terminal of a second resistor to a gate terminal of the second P-FET; and coupling a second terminal of the second resistor to the source terminal of the second P-FET and to the second power supply.

15. The method of claim 14, wherein, when the high-side output exhibits the high voltage level, a gate voltage on the gate terminal of the second P-FET equalizes to the voltage level of the second power supply to turn off the second P-FET.

16. The method of claim 15, further comprising:

coupling a drain terminal of a first N-FET to the gate terminal of the second P-FET and to the first terminal of the second resistor; and coupling a source terminal of the first N-FET to the ground plane.

17. The method of claim 16, wherein, when the high-side output exhibits the high voltage level, the gate terminal of the first N-FET receives a logic low voltage to turn off the first N-FET, permitting the gate terminal of the second P-FET rise to the voltage level of the second power supply through the second resistor.

18. The method of claim 17, further comprising:

coupling a drain terminal of a second N-FET to the second terminal of the first resistor, to the source terminal of the high-side N-FET, and to the drain terminal of the low-side N-FET;

coupling a gate terminal of the second N_FET to the high-side output and to the drain terminal of the first P-FET; and coupling a source terminal of the second N-FET to the high-side source output.

19. The method of claim 18, wherein, in a second phase of the discontinuous current mode, the high-side output exhibits the logic low voltage to turn off the second N-FET.

20. A buck converter for an information handling system, the buck converter comprising:

a high-side N-FET having a drain terminal coupled to a first power supply, a gate terminal, and a source terminal;

a low-side N-FET having a drain terminal coupled to the source terminal of the high-side N-FET, a gate terminal, and a source terminal coupled to a ground plane;

a first P-FET having a drain terminal, a gate terminal, and a source terminal coupled to the gate terminal of the high-side N-FET;

a first resistor having a first terminal coupled to the gate terminal of the first P-FET and a second terminal coupled to the source terminal of the first P-FET and to the gate terminal of the high-side N-FET;

a capacitor having a first terminal coupled to the source terminal of the high-side N-FET and to the drain terminal of the low-side N-FET, and a second terminal;

a FET driver having a high-side output coupled to the drain terminal of the first P-FET, a high-side source output coupled to the source contact of the high-side N-FET and to the drain contact of the low-side N-FET, a low-side output coupled to the gate terminal of the low-side N-FET, and a capacitor output coupled to the second terminal of the capacitor, wherein the FET driver operates in a selectable one of a continuous current mode and a discontinuous current mode;

a second P-FET having a drain terminal coupled to the gate terminal of the first P-FET, a gate terminal, and a drain terminal coupled to a second power supply;

a second resistor having a first terminal coupled to the gate terminal of the second P-FET and a second terminal coupled to the source terminal of the second P-FET and to the second power supply;

a first N-FET having a drain terminal coupled to the gate terminal of the second P-FET and to the first terminal of the second resistor, a gate terminal, and a source terminal coupled to the ground plane;

a second N-FET having a drain terminal coupled to the second terminal of the first resistor, the source terminal of the high-side N-FET, and to the drain terminal of the low-side N-FET, a gate terminal couple to the high-side output and to the drain terminal of the first P-FET, and a source terminal coupled to the high-side source output;

a third N-FET having a drain terminal coupled to the high-side source output, the first terminal of the capacitor, and the source terminal of the second N-FET, a source terminal coupled to the ground plane, and a gate terminal; and an inverter having an input terminal coupled to the high-side input, and an output terminal coupled to the gate terminal of the first N-FET and to the gate terminal of the third N-FET.

* * * * *